(12) United States Patent
Ishizeki (10) Patent No.: US 10,243,498 B2
(45) Date of Patent: Mar. 26, 2019

(54) POWER CONVERTER CONTROL DEVICE

(71) Applicant: DAIKIN INDUSTRIES, LTD., Osaka-shi, Osaka (JP)

(72) Inventor: Shinichi Ishizeki, Osaka (JP)

(73) Assignee: Daikin Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 15/776,518

(22) PCT Filed: Nov. 10, 2016

(86) PCT No.: PCT/JP2016/083347
§ 371 (c)(1),
(2) Date: May 16, 2018

(87) PCT Pub. No.: WO2017/115561
PCT Pub. Date: Jul. 6, 2017

(65) Prior Publication Data
US 2018/0375455 A1 Dec. 27, 2018

(30) Foreign Application Priority Data
Dec. 28, 2015 (JP) .................. 2015-256282

(51) Int. Cl.
*H02M 1/14* (2006.01)
*H02P 23/04* (2006.01)
(Continued)

(52) U.S. Cl.
CPC .......... *H02P 23/04* (2013.01); *H02M 5/4585* (2013.01); *H02M 7/5387* (2013.01); *H02P 27/06* (2013.01)

(58) Field of Classification Search
CPC .... H02M 1/14; H02M 7/5387; H02M 5/4585; H02P 27/06; H02P 23/04
(Continued)

(56) References Cited

U.S. PATENT DOCUMENTS

| | | | | | |
|---|---|---|---|---|---|
| 4,983,895 A | * | 1/1991 | Koharagi | ............. | A47L 9/2831 318/400.12 |
| 2011/0194947 A1 | * | 8/2011 | Hong | ............. | F25B 49/025 417/44.11 |

(Continued)

FOREIGN PATENT DOCUMENTS

| EP | 0642211 A2 | 3/1995 |
|---|---|---|
| JP | 2010-130752 A | 6/2010 |

(Continued)

OTHER PUBLICATIONS

Fukue et al., "Development of A-Single-to-Three-Phase-Indirect-Matrix-Converter for Sensorless DCBL Motor Drive of 1 Piston Rotary Compressor", 57th Electrical Science and Engineering Promotion Awards, Panasonic's Award Winning Technologies, 2009, pp. 45-50, including an English Abstract.

(Continued)

*Primary Examiner* — Jorge L Carrasquillo
(74) *Attorney, Agent, or Firm* — Birch, Stewart, Kolasch & Birch, LLP (57) ABSTRACT

Ripple power having a first variation range is input into a DC link (DC power supply lines). Buffer power is provided and received between the DC link and a power buffer circuit, so that the DC link outputs DC power having a second variation range smaller than the first variation range. An inverter receives the DC power as an input, and outputs AC power to a motor. A power control unit controls the power buffer circuit and the inverter on the basis of a compensation rate that sets the second variation range. A compensation rate setting unit performs a setting in which the compensation rate when a rotational speed of the motor belongs to any of a plurality of first predetermined ranges is higher than the compensation rate when the rotational speed belongs to a (Continued)

second predetermined range other than the plurality of first predetermined ranges.

8 Claims, 7 Drawing Sheets

(51) Int. Cl.
*H02M 7/5387* (2007.01)
*H02M 5/458* (2006.01)
*H02P 27/06* (2006.01)

(58) Field of Classification Search
USPC .................. 318/400.26, 568.22, 632, 400.3
See application file for complete search history.

(56) References Cited

U.S. PATENT DOCUMENTS

| | | | | |
|---|---|---|---|---|
| 2012/0038311 | A1* | 2/2012 | Villwock | G01R 31/34 318/806 |
| 2015/0115854 | A1* | 4/2015 | Pottebaum | H02P 6/10 318/445 |
| 2016/0233782 | A1 | 8/2016 | Sakakibara | |
| 2016/0248335 | A1 | 8/2016 | Sakakibara | |
| 2016/0294300 | A1 | 10/2016 | Sakakibara et al. | |

FOREIGN PATENT DOCUMENTS

| | | |
|---|---|---|
| JP | 2011-050159 A | 3/2011 |
| JP | 2011-193678 A | 9/2011 |
| JP | 2015-076921 A | 4/2015 |
| JP | 2015-084637 A | 4/2015 |
| JP | 2015-165731 A | 4/2015 |
| JP | 2015-95978 A | 5/2015 |
| KR | 10-2011-0092054 A | 8/2011 |

OTHER PUBLICATIONS

Fukue et al., "The Development of A-Single-to-Three-Phase-Indirect-Matrix-Converter for Sensorless DCBL motor drive of 1 piston rotary compressor", Proceedings of the Japan Industry Applications Society Conference, Aug. 27, 2008, No. 1, pp. 469-470, including an English Abstract.

International Search Report for PCT/JP2016/083347 (PCT/ISA/210) dated Jan. 24, 2017.

Salam et al., "Compensation of fluctuating DC link voltage for traction inverter drive," Sixth International Conference on Power Electronics and Variable Speed Drives, Sep. 23-25, 1996, pp. 390-395.

* cited by examiner

POWER CONVERTER CONTROL DEVICE

TECHNICAL FIELD

The present invention relates to a power converter control device.

BACKGROUND ART

Japanese Patent Application Laid-Open No. 2015-084637, Japanese Patent Application Laid-Open No. 2015-065731 and Japanese Patent Application Laid-Open No. 2015-076921 each disclose a direct power converter. This direct power converter includes a diode rectifier, an inverter, and a charge and discharge circuit.

The diode rectifier full-wave rectifies a single-phase AC voltage, and outputs a rectified voltage after rectification across a pair of DC power supply lines (a DC link).

The charge and discharge circuit is provided to the DC link, and includes a buffer circuit and a boost circuit. The buffer circuit has a switch and a capacitor connected in series between the pair of DC power supply lines. When the switch is conducting, the capacitor discharges to provide power to the DC link.

The boost circuit boosts the rectified voltage from the diode rectifier to charge the capacitor. This allows the charge and discharge circuit to receive power from the DC link. An input voltage (a DC voltage from the DC link) of the inverter matches the boosted voltage for the capacitor when the above-mentioned switch is conducting, and matches the rectified voltage when the switch is not conducting. The inverter receives the DC voltage from the DC link as an input, converts it into an AC voltage, and outputs the AC voltage.

Fukue et al., "The Development of A-Single-to-Three-Phase-Indirect-Matrix-Converter for Sensorless DCBL motor drive of 1 piston rotary compressor", Proceedings of the Japan Industry Applications Society Conference, Aug. 27, 2008, No. 1, pp. 469-470 is presented as technology relating to the present invention.

SUMMARY OF INVENTION

Problem to be Solved by the Invention

Japanese Patent Application Laid-Open No. 2015-084637, Japanese Patent Application Laid-Open No. 2015-065731 and Japanese Patent Application Laid-Open No. 2015-076921, however, lack consideration of noise created by a motor or a load thereon. It is desirable that such noise be small. It is also desirable to drive the motor with high efficiency.

An object of the present application is thus to provide a direct-power converter control device that enables driving of a motor with high efficiency while suppressing noise.

Means to Solve the Problem

A first aspect of a power converter control device according to the present invention is a device for controlling, in a power converter including a power buffer circuit (4), a DC link (LH, LL), and an inverter (5), the power buffer circuit and the inverter, the DC link receiving ripple power (Pin) having a first variation range as an input, providing and receiving buffer power (Pbuf) to and from the power buffer circuit (4), and outputting DC power (Pout) having a second variation range smaller than the first variation range, the inverter receiving the DC power as an input, and outputting AC power to a motor (6), the power converter control device including: a power control unit (11) that controls the power buffer circuit and the inverter on the basis of a compensation rate (k) that sets the second variation range; and a compensation rate setting unit (12) that performs a setting in which the compensation rate when a rotational speed of the motor belongs to any of a plurality of first predetermined ranges (A1) is higher than the compensation rate when the rotational speed belongs to a second predetermined range (A2) other than the plurality of first predetermined ranges.

A second aspect of the power converter control device according to the present invention is the power converter control device according to the first aspect in which the compensation rate setting unit (12) sets the compensation rate in a first range (A12) of the plurality of first predetermined ranges lower than the compensation rate in a second range (A11) of the plurality of first predetermined ranges in which the rotational speed is lower than that in the first range.

A third aspect of the power converter control device according to the present invention is the power converter control device according to the first or second aspect in which the compensation rate setting unit (12) performs the setting only when the rotational speed belongs to any of the plurality of first predetermined ranges lower than a predetermined threshold ($\omega$ref2).

A fourth aspect of the power converter control device according to the present invention is the power converter control device according to any one of the first to third aspects in which the compensation rate setting unit (12) sets the compensation rate so that the second variation range becomes zero when the rotational speed belongs to any of the plurality of first predetermined ranges.

Effects of the Invention

According to the first aspect of the power converter control device according to the present invention, when the compensation rate is high, the variation range of the DC power input into the inverter is small, and thus noise created by the motor is small. The noise increases periodically with increasing rotational speed. Since the compensation rate is set to be high in the plurality of first predetermined ranges, the noise in the first ranges can be reduced by setting a range in which the noise increases to the plurality of first predetermined ranges.

The compensation rate is set to be low when the rotational speed belongs to the second predetermined range. Loss caused in the power buffer circuit can be reduced by setting the compensation rate to be low, leading to an increase in efficiency.

According to the second aspect of the power converter control device according to the present invention, the compensation rate is set to be lower in the first range in which the rotational speed is higher than that in the second range. A current flowing through the power converter tends to increase with increasing rotational speed. Thus, a current flowing through the power buffer circuit increases with increasing rotational speed if the compensation rate is the same. In the second aspect, the compensation rate is set to be low in the first range, and thus the increase in current flowing through the power buffer circuit when the rotational speed is high can be suppressed. This suppresses a decrease in efficiency, and contributes to reduction in size of the power buffer circuit.

According to the third aspect of the power converter control device according to the present invention, there is no need to increase the compensation rate when the rotational speed is higher than the threshold, leading to suppression of the decrease in efficiency and contribution to the reduction in size of the power buffer circuit.

According to the fourth aspect of the power converter control device according to the present invention, the noise can be minimized.

The objects, features, aspects, and advantages of the present invention will become more apparent from the following detailed description and the accompanying drawings.

DESCRIPTION OF EMBODIMENTS

A. Configuration of Direct Power Converter

Figure 1:
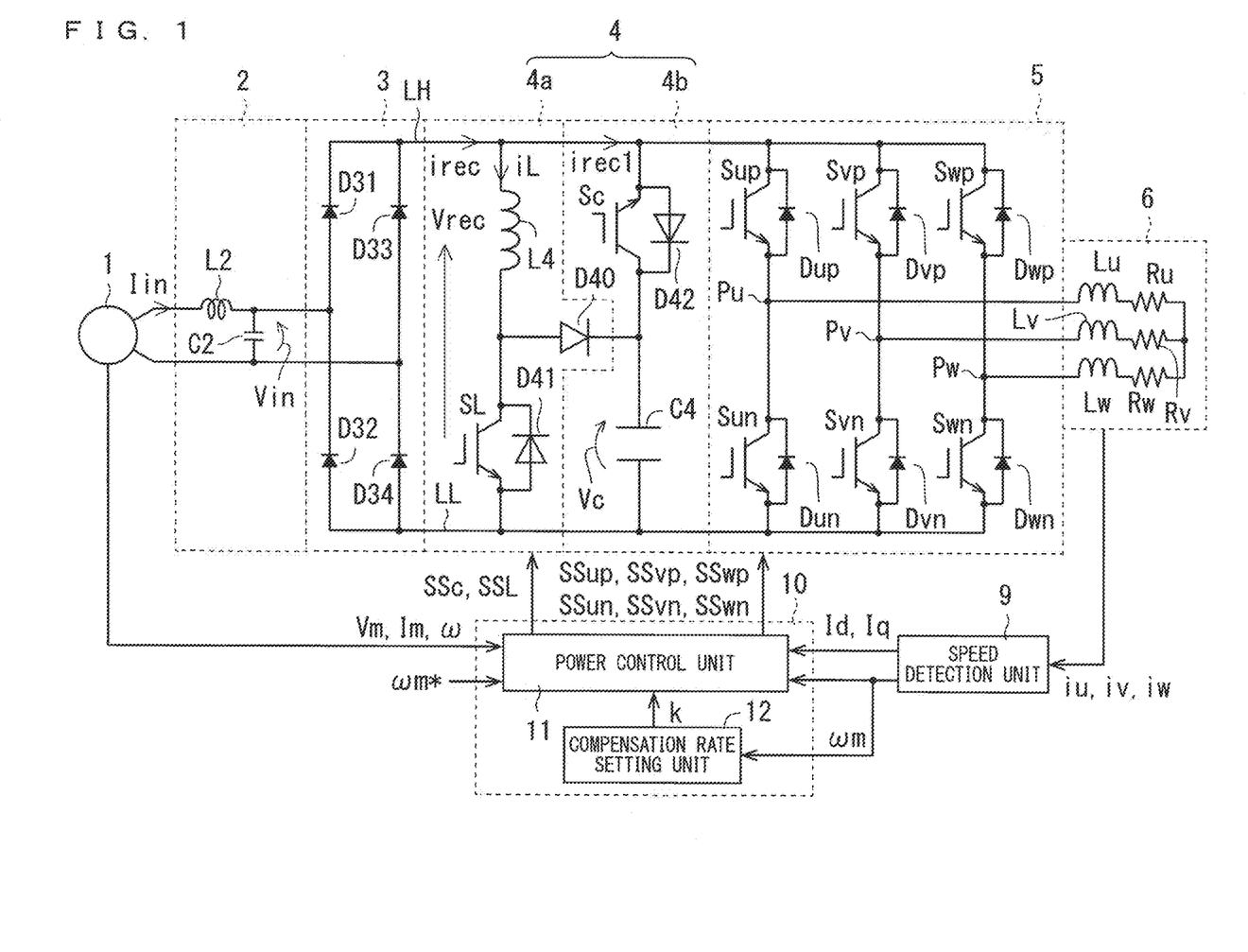
FIG. 1 is a block diagram showing the configuration of a direct power converter to which a control method shown in an embodiment is applied.

FIG. 1 is a block diagram showing the configuration of a direct power converter to which a control method shown in the present embodiment is applied. The direct power converter includes a converter 3, a power buffer circuit 4, and an inverter 5.

The converter 3 is a single-phase rectifying circuit, and is connected to a single-phase AC power supply 1, for example, via a filter 2. The filter 2 includes a reactor L2 and a capacitor C2. The reactor L2 is connected between one of two output terminals of the single-phase AC power supply 1 and the converter 3. The capacitor C2 is connected in series to the reactor L2 between the two output terminals of the single-phase AC power supply 1. The filter 2 removes a high-frequency component of a current. The filter 2 may be omitted. Description will be made below while ignoring the function of the filter 2 for simplicity.

The converter 3 uses, for example, a diode bridge, and includes diodes D31 to D34. The diodes D31 to D34 constitute a bridge circuit, single-phase full-wave rectify a single-phase AC voltage Vin, which is an input voltage input from the single-phase AC power supply 1, to convert it into a rectified voltage Vrec, and output the rectified voltage Vrec across DC power supply lines LH and LL (they form a so-called DC link). A potential higher than that applied to the DC power supply line LL is applied to the DC power supply line LH. An input current Iin flows from the single-phase AC power supply 1 into the converter 3.

The power buffer circuit 4 is a circuit that provides and receives power to and from the DC link, and includes a boost circuit 4a and a buffer circuit 4b. The buffer circuit 4b includes a capacitor C4. The boost circuit 4a boosts the rectified voltage Vrec to charge the capacitor C4.

The buffer circuit 4b further includes a transistor (herein an insulated-gate bipolar transistor: hereinafter abbreviated as an "IGBT") Sc connected in antiparallel to a diode D42. The transistor Sc is connected in series to the capacitor C4 between the DC power supply lines LH and LL at a side closer to the DC power supply line LH. Herein, connecting A and B in antiparallel refers to connecting A and B in parallel so that a forward direction of A and a forward direction of B are opposite to each other. Specifically, a forward direction of the transistor Sc is a direction from the DC power supply line LL towards the DC power supply line LH, and a forward direction of the diode D42 is a direction from the DC power supply line LH towards the DC power supply line LL. The transistor Sc and the diode D42 can collectively be understood as a single switch element (first switch).

The boost circuit 4a includes a diode D40, a reactor L4, and a transistor (herein an IGBT) SL, for example. The diode D40 includes a cathode and an anode, and the cathode is connected between the first switch and the capacitor C4.

The reactor L4 is connected between the DC power supply line LH and the anode of the diode D40. The transistor SL is connected between the DC power supply line LL and the anode of the diode D40. A diode D41 is connected in antiparallel to the transistor SL, and they can collectively be understood as a single switch element (second switch). The boost circuit 4a is known as a so-called boost chopper.

The capacitor C4 is charged by the boost circuit 4a, and a voltage Vc higher than the rectified voltage Vrec is generated. Specifically, a current is allowed to flow from the DC power supply line LH to the DC power supply line LL via the second switch to store energy in the reactor L4, and then the second switch is turned off to store the energy in the capacitor C4 via the diode D40. This enables the power buffer circuit 4 to receive power from the DC link.

Since the voltage Vc is higher than the rectified voltage Vrec, a current basically does not flow through the diode D42. Whether the first switch is conducting or not thus depends solely on whether the transistor Sc is conducting or not. Not only the transistor Sc but also the first switch including the transistor Sc and the diode D42 is thus hereinafter also referred to as a switch Sc. When the switch Sc is conducting, the capacitor C4 discharges so that the power buffer circuit 4 can provide power to the DC link.

Since the DC power supply line LH is higher in potential than the DC power supply line LL, a current basically does not flow through the diode D41. Whether the second switch is conducting or not thus depends solely on whether the transistor SL is conducting or not. Not only the transistor SL but also the second switch including the transistor SL and the diode D41 is thus hereinafter also referred to as a switch SL.

The inverter 5 converts the DC voltage across the DC power supply lines LH and LL into an AC voltage, and outputs the AC voltage to output terminals Pu, Pv, and Pw.

When this is described in terms of power, the inverter 5 receives DC power from the DC link as an input, and outputs AC power to a motor 6. The inverter 5 includes six switching elements Sup, Svp, Swp, Sun, Svn, and Swn. The switching elements Sup, Svp, and Swp are respectively connected between the output terminals Pu, Pv, and Pw and the DC power supply line LH, and the switching elements Sun, Svn, and Swn are respectively connected between the output terminals Pu, Pv, and Pw and the DC power supply line LL. The inverter 5 forms a so-called voltage source inverter, and includes six diodes Dup, Dvp, Dwp, Dun, Dvn, and Dwn.

The diodes Dup, Dvp, Dwp, Dun, Dvn, and Dwn are arranged with their cathodes being directed towards the DC power supply line LH and their anodes being directed towards the DC power supply line LL. The diode Dup is connected in parallel to the switching element Sup between the output terminal Pu and the DC power supply line LH. Similarly, the diodes Dvp, Dwp, Dun, Dvn, and Dwn are respectively connected in parallel to the switching elements Svp, Swp, Sun, Svn, and Swn.

IGBTs are used as the switching elements Sup, Svp, Swp, Sun, Svn, and Swn, for example.

The AC voltage is applied from the inverter 5 to the motor 6. The motor 6 rotates in accordance with the AC voltage. The motor 6 drives a load (e.g., a compressor), which is not illustrated. In a case where the compressor is used as the load, the compressor may be mounted on an air conditioner, for example.

FIG. 1 shows an equivalent circuit of the motor 6. In a specific example, an inductance component Lu and a resistance component Ru of a winding of a U phase are connected in series, and one end of the series-connected body is connected to the output terminal Pu. The same applies to windings of a V phase and a W phase. The other ends of these series-connected bodies are connected together.

B. Control Method (b-1) Basic Concept of Reduction in Power Ripple

Input power Pin input into the converter 3 is expressed by an equation shown below with an input power factor being 1. Note that a peak value Vm and a power supply angular speed ω of the single-phase AC voltage Vin, a peak value Im of the input current Iin, and time t are introduced. The product ωt of the power supply angular speed ω and the time t represents a phase angle of the single-phase AC voltage Vin. An AC waveform is understood as the product of a sine value of the phase angle ωt and the peak value of the AC waveform.

$$Pin = Vm \cdot Im \cdot \sin^2(\omega t) \qquad (1)$$
$$= \frac{1}{2}Vm \cdot Im - \frac{1}{2}Vm \cdot Im \cdot \cos(2\omega t)$$

The second term of the rightmost side of the equation (1) indicates power ripple. A variation range of the input power Pin is the amplitude of the second term of the rightmost side of the equation (1), and is indicated by Vm·Im/2. Power that the converter 3 outputs to the DC link is ideally equal to the input power Pin input into the converter 3. The input power Pin can thus be understood as power input into the DC link. That is to say, power having a first variation range (Vm·Im/2) is input into the DC link. The power ripples, and is thus hereinafter also referred to as ripple power Pin.

To reduce a variation range of DC power Pdc output from the DC link to the inverter 5, the power buffer circuit 4 should provide and receive power to and from the DC link so that the amplitude of the second term of the rightmost side of the equation (1) is reduced. The power provided and received by the power buffer circuit 4 is hereinafter referred to as buffer power Pbuf. The buffer power Pbuf is determined by the following equation, for example, by introducing a positive variable k equal to or smaller than 1.

$$Pbuf = \frac{k}{2}Vm \cdot Im \cdot \cos(2\omega t) \qquad (2)$$

That is to say, the buffer power Pbuf is expressed by the product of a DC part (Vm·Im/2) of the input power Pin input from the single-phase AC power supply 1 (or further via the filter 2: the same applies to the following), a cosine value cos(2 ωt) of a value (2ωt) that is twice the phase angle ωt, and the variable k.

Figure 2A:
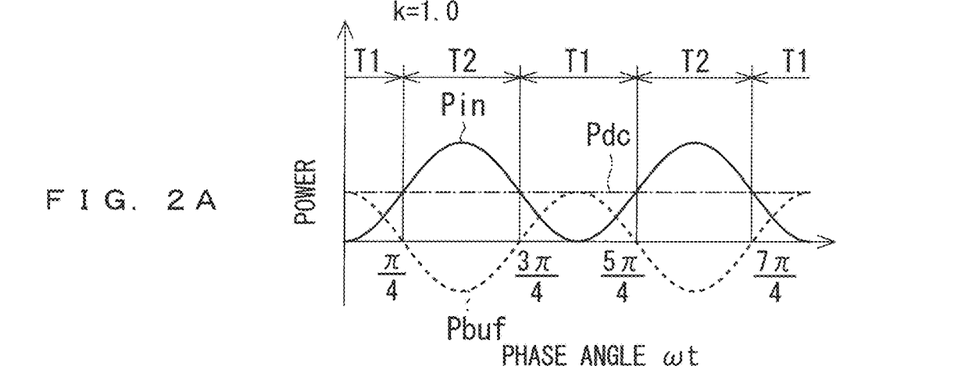
FIGS. 2A and 2B are diagrams illustrating power.
Figure 2B:
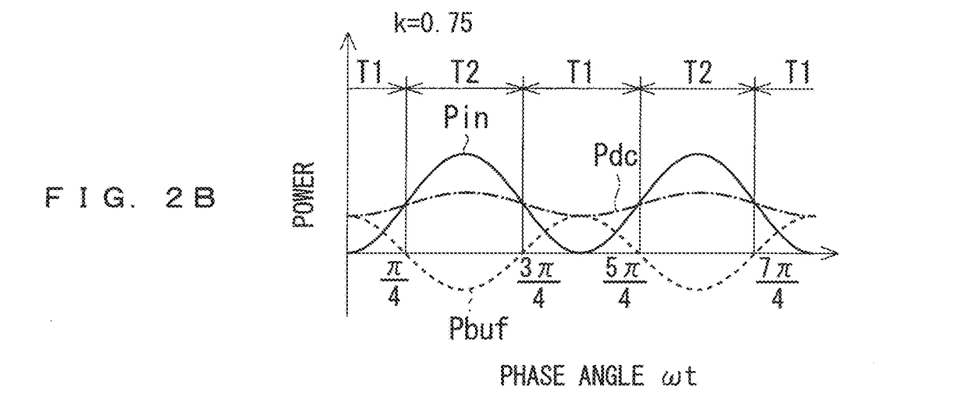

FIGS. 2A and 2B show graphs each showing examples of the power. Each of the graphs shows the input power Pin, the buffer power Pbuf, and the DC power Pdc. These graphs differ in variable k as described below.

As can be understood from FIGS. 2A and 2B, the buffer power Pbuf takes a positive value in a first time period T1 in which the phase angle ωt of the single-phase AC voltage is 0 to π/4 inclusive, 3π/4 to 5π/4 inclusive, or 7π/4 to 2π inclusive, and takes a negative value in a second time period T2 other than the first time period T1. That is to say, the power buffer circuit 4 provides the absolute value of the buffer power Pbuf to the DC link in the first time period T1, and receives the absolute value of the buffer power Pbuf from the DC link in the second time period T2.

The single-phase AC voltage Vin is expressed by Vm·sin (ωt), and thus, by describing the above-mentioned range in another way, it can also be said that the power buffer circuit 4 outputs positive power when the absolute value of the single-phase AC voltage Vin is smaller than a value that is 1/√2 times the peak value Vm thereof, and outputs negative power when the absolute value of the single-phase AC voltage Vin is greater than the value that is 1/√2 times the peak value Vm thereof.

The power buffer circuit 4 may receive power from the DC link in the first time period T1. The power buffer circuit 4 should output the buffer power Pbuf shown in FIGS. 2A and 2B to the DC link as a result of the balance of power in the first time period T1. Similarly, the power buffer circuit 4 may output power to the DC link in the second time period T2. The power buffer circuit 4 should receive the absolute value of the buffer power Pbuf shown in FIGS. 2A and 2B from the DC link as a result of the balance of power in the second time period T2.

The DC power Pdc input into the inverter 5 is expressed by an equation shown below using the input power Pin and the buffer power Pbuf. The DC power Pdc input into the inverter 5 and output power Pout output from the inverter 5 are ideally equal to each other.

$$Pdc = Pout = Pin + Pbuf \qquad (3)$$
$$= \frac{1}{2}Vm \cdot Im - \frac{1-k}{2}Vm \cdot Im \cdot \cos(2\omega t)$$

As shown in the second term of the rightmost side of the equation (3), the variation range of ripple of the DC power Pdc (=output power Pout) is indicated by (1−k)·Vm·Im/2. Since the variable k is greater than 0 and equal to or smaller than 1, the variation range is smaller than the variation range of the ripple power Pin (amplitude of the second term of the rightmost side of the equation (1)). That is to say, by using the equation (2) as the buffer power Pbuf, the DC link outputs the DC power Pdc having the variation range smaller than the variation range of the ripple power Pin to the inverter 5.

The variable k corresponds to a magnitude of a difference between the variation range of the ripple power Pin and the variation range of the DC power Pdc, and indicates a degree of reduction in power ripple. The power ripple is reduced as the variable k increases. It can be said that, when an equation k=1 holds, for example, the ripple can be canceled out as the second term of the rightmost side of the equation (3) becomes zero. The variable k is hereinafter also referred to as a compensation rate k.

When the above-mentioned reduction in ripple is described qualitatively, the power buffer circuit 4 receives power from the DC link as an input to store the power when the ripple power Pin is large (in the first time period T1), and outputs power to the DC link when the ripple power Pin is small (in the second time period T2) to reduce the ripple of the DC power Pdc (=output power Pout) input into the inverter 5.

FIG. 2A shows the ripple power Pin, the buffer power Pbuf, and the output power Pout when the compensation rate k is 1, and FIG. 2B shows the above-mentioned parameters when the compensation rate k is 0.75. When the compensation rate k is 1, the output power Pout becomes constant without rippling. This means that the ripple is canceled out. When the compensation rate k is 0.75, the output power Pout ripples, but the variation range thereof is smaller than the variation range of the ripple power Pin. This means that the ripple is reduced.

The variation range of the ripple power Pin is not changed by the compensation rate k, and it can thus be said that the compensation rate k sets the variation range of the output power Pout. The variation range of the output power Pout decreases with increasing compensation rate k.

Examples of a technique for achieving the buffer power Pbuf as described above are described in details in Japanese Patent Application Laid-Open No. 2015-084637, Japanese Patent Application Laid-Open No. 2015-065731 and Japanese Patent Application Laid-Open No. 2015-076921. In the present embodiment, any of the techniques described in Japanese Patent Application Laid-Open No. 2015-084637, Japanese Patent Application Laid-Open No. 2015-065731 and Japanese Patent Application Laid-Open No. 2015-076921 may be used. Although detailed description of this technique is omitted, in short, the power buffer circuit 4 (switches SL and Sc) and the inverter 5 (switching elements Sup, Svp, Swp, Sun, Svn, and Swn) are controlled on the basis of the compensation rate k to cause the power buffer circuit 4 to provide and receive the buffer power Pbuf in the equation (2). This causes the output power Pout to have the value shown in the equation (3). An example of control performed using the compensation rate k will generally be described below for reference.

(b-2) Reduction in Noise

Figure 3:
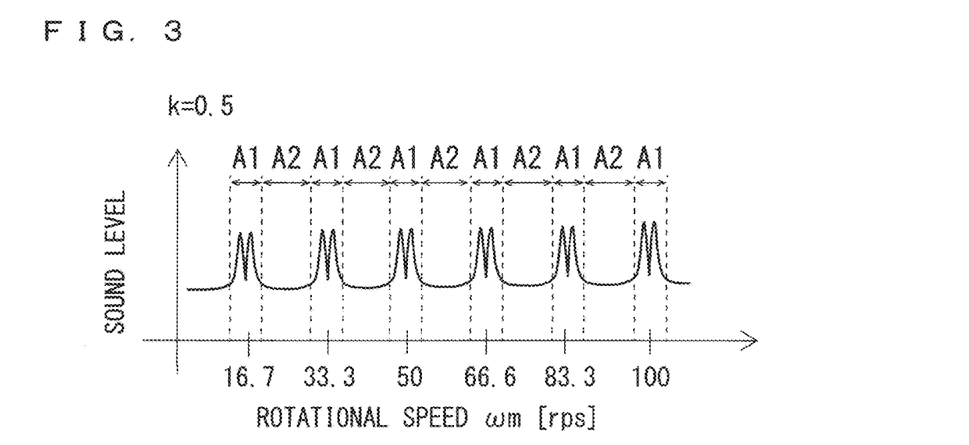
FIG. 3 is a diagram schematically showing an example of a sound level of noise.

When the motor 6 drives the load (e.g., compressor), noise is created by a mechanical vibration thereof. The noise is also referred to as a whine from its sound. In the present embodiment, the compensation rate k is changed on the basis of a rotational speed ωm of the motor 6 to reduce the noise. FIG. 3 schematically shows an example of the relationship between the rotational speed ωm of the motor 6 and a sound level of the noise when a constant value is used as the compensation rate k. A value smaller than 1 (e.g., 0.5) is used as the compensation rate k. As illustrated in FIG. 3, the sound level of the noise increases periodically with increasing rotational speed ωm of the motor 6. That is to say, the sound level increases and decreases repeatedly with increasing rotational speed ωm. The relationship between the rotational speed ωm and the sound level can be set in advance, for example, by experiments or simulations (see, for example, Fukue et al., "The Development of A-Single-to-Three-Phase-Indirect-Matrix-Converter for Sensorless DCBL motor drive of 1 piston rotary compressor", Proceedings of the Japan Industry Applications Society Conference, Aug. 27, 2008, No. 1, pp. 469-470).

Frequency finv of the AC voltage applied to the motor 6 corresponds to the rotational speed ωm, and increases with increasing rotational speed ωm. In a case where the motor 6 is a synchronous motor, for example, the frequency tiny is equal to the rotational speed ωm. Description can thus be made by replacing the above-mentioned rotational speed ωm with the frequency finv. That is to say, it can also be said that the sound level increases periodically with increasing frequency tiny.

Figure 4A:
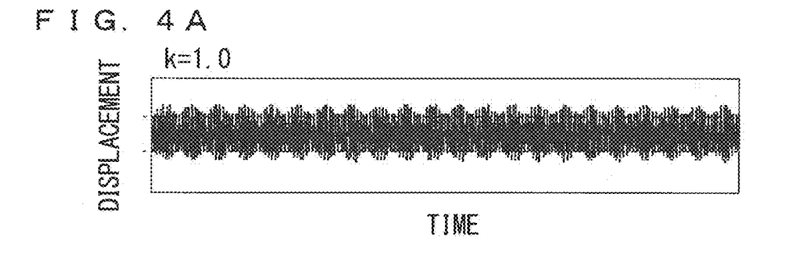
FIGS. 4A to 4C are diagrams illustrating displacement of a compressor.
Figure 4B:
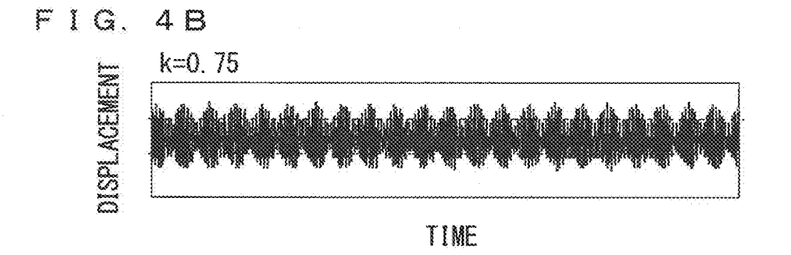
Figure 4C:
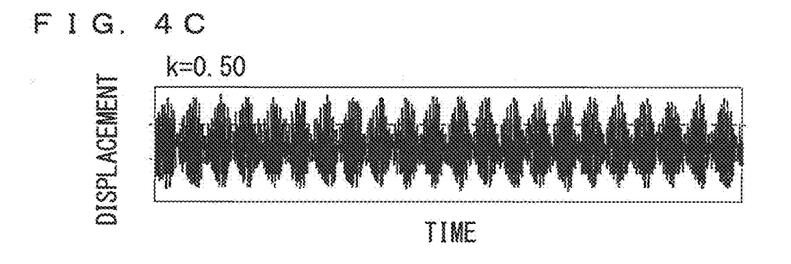

Incidentally, the sound level also depends on the variation range of the output power Pout output from the inverter 5. The sound level increases with increasing variation range. That is to say, the sound level increases with increasing variation range of the output power Pout output from the inverter 5 if the rotational speed ωm is the same. FIGS. 4A to 4C show changes over time of displacement of the compressor driven by the motor 6. 4A shows displacement when the compensation rate k is 1.0, FIG. 4B shows displacement when the compensation rate k is 0.75, and FIG. 4C shows displacement when the compensation rate k is 0.50. The three graphs are the same in rotational speed torn of the motor 6. As shown in FIGS. 4A to 4C, a peak of displacement of the compressor increases with decreasing compensation rate k, that is, with increasing variation range of the output power Pout. It is considered that the sound level increases with increasing amount of displacement of the compressor, and thus the sound level increases with decreasing compensation rate k. In other words, the sound level can be reduced by setting the compensation rate k so that the compensation rate k is high.

Figure 5:
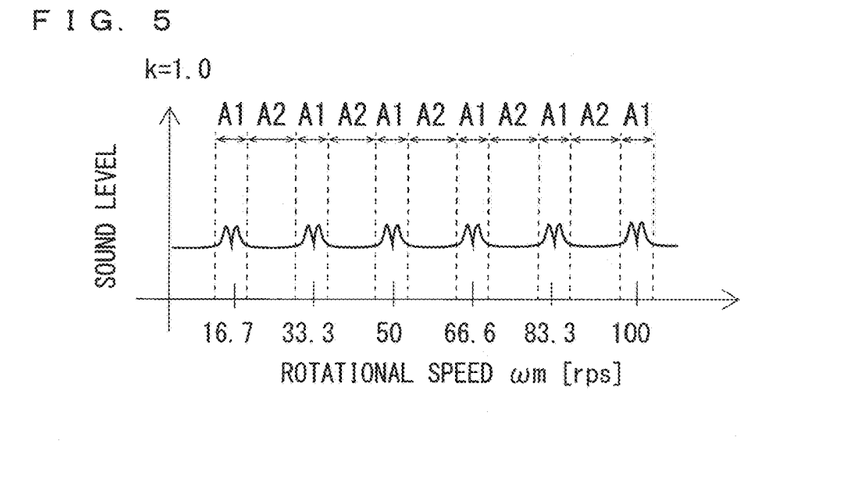
FIG. 5] is a diagram schematically showing an example of the sound level of the noise.

FIG. 5 schematically shows an example of the relationship between the rotational speed ωm of the motor 6 and the sound level of the noise when the compensation rate k is 1.0. It can be seen, from comparison between FIGS. 3 and 5, that each peak of the sound level is reduced by improving the compensation rate k.

Figure 6:
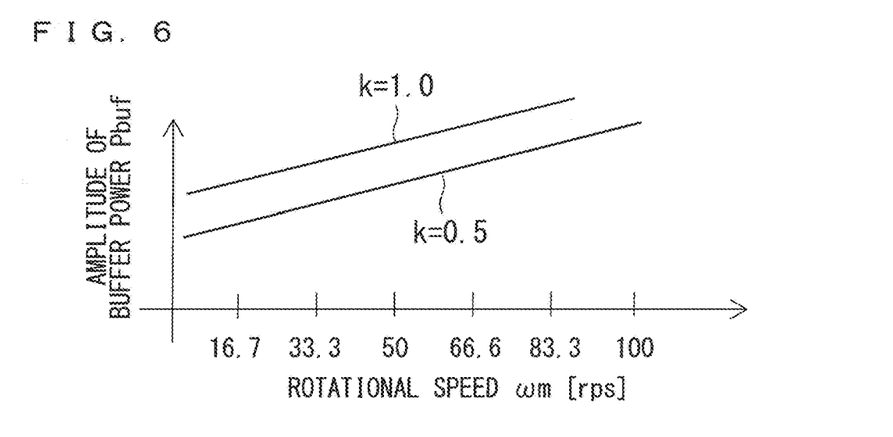
FIG. 6 is a diagram schematically illustrating the amplitude of buffer power.

On the other hand, the amplitude (k·Vm·Im/2) of the buffer power Pbuf is large when the compensation rate k is high, as can be understood from the equation (2). FIG. 6 schematically shows an example of the relationship between the amplitude of the buffer power Pbuf and the rotational speed ωm. In the example of FIG. 6, the relationship when the compensation rate k is 1.0 and the relationship when the compensation rate k is 0.5 are shown, and the amplitude of the buffer power Pbuf increases with increasing compensation rate k.

Loss caused in the power buffer circuit 4 also increases with increasing amplitude of the buffer power Pbuf provided and received by the power buffer circuit 4. The loss thus increases with increasing compensation rate k, and reduces efficiency.

In the present embodiment, the compensation rate k when the rotational speed ωm belongs to any of a plurality of predetermined ranges A1 is set to be higher than the compensation rate k when the rotational speed ωm belongs to a predetermined range A2 other than the predetermined ranges A1. The predetermined ranges A1 are each set to a range in which the sound level increases as shown in FIGS. 3 and 5. That is to say, the predetermined ranges A1 are set to each include a peak of the sound level. Such predetermined ranges A1 are set in advance, and stored in a storage, for example.

Figure 7:
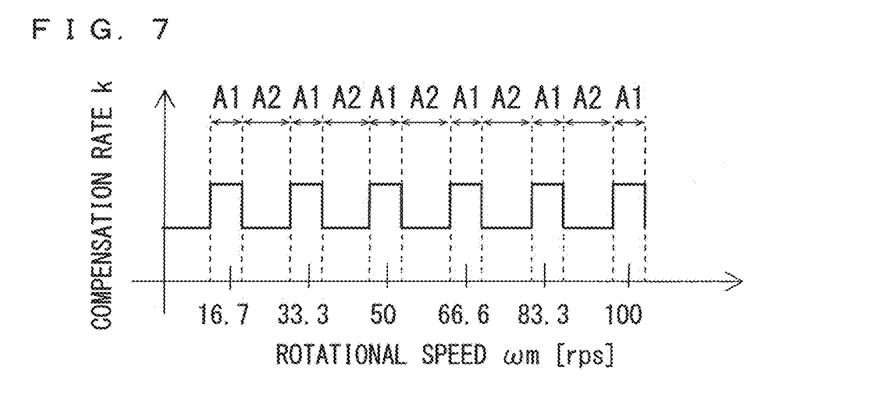
FIG. 7 is a diagram schematically showing an example of a compensation rate.

FIG. 7 schematically shows an example of the compensation rate k. As illustrated in FIG. 7, the compensation rate k is higher in the predetermined ranges A1 than in predetermined ranges A2. This can reduce the peak of the sound level in each of the predetermined ranges A1. For example, the compensation rate k may be 1 in the predetermined ranges A1. This means that, in the predetermined ranges A1, the compensation rate k may be set so that the variation range of the DC power Pdc (=output power Pout) becomes zero (see FIG. 2A). This can minimize the sound level.

The compensation rate k is set to be lower in the predetermined ranges A2 than in the predetermined ranges A1. The amplitude of the buffer power Pbuf can thus be reduced in the predetermined ranges A2. This can reduce the loss caused in the power buffer circuit 4. The motor 6 can thus be driven with higher efficiency.

The configuration to perform the above-mentioned control will be described next. In the example of FIG. 1, a speed detection unit 9 and a control device 10 are provided. The speed detection unit 9 detects the rotational speed ωm of the motor 6. For example, AC currents iu, iv, and iw flowing through the motor 6 are input into the speed detection unit 9. The AC currents iu, iv, and iw are detected by a known current detection unit. The speed detection unit 9 calculates the rotational speed ωm of the motor 6 on the basis of the AC currents iu, iv, and iw, and outputs it to the control device 10.

The control device 10 includes a power control unit 11 and a compensation rate setting unit 12. The control device 10 herein includes a microcomputer and a storage device. The microcomputer performs processing steps (i.e., procedures) written in a program. The above-mentioned storage device can be formed by one or more various storage devices, such as read only memory (ROM), random access memory (RAM), rewritable non-volatile memory (e.g., erasable programmable ROM (EPROM)), and a hard disk drive. The storage device stores various pieces of information, data, and the like, stores the program executed by the microcomputer, and provides a work area for executing the program. The microcomputer can be understood to function as various units corresponding to the respective processing steps written in the program, or to achieve various functions corresponding to the respective processing steps. The control device 10 is not limited to this, and some or all of various procedures performed by the control device 10 or various units or various functions achieved by the control device 10 may be achieved by hardware.

The rotational speed ωm detected by the speed detection unit 9 is input into the compensation rate setting unit 12. The compensation rate setting unit 12 sets the compensation rate k on the basis of the rotational speed ωm as described above, and outputs the compensation rate k to the power control unit 11.

Figure 8:
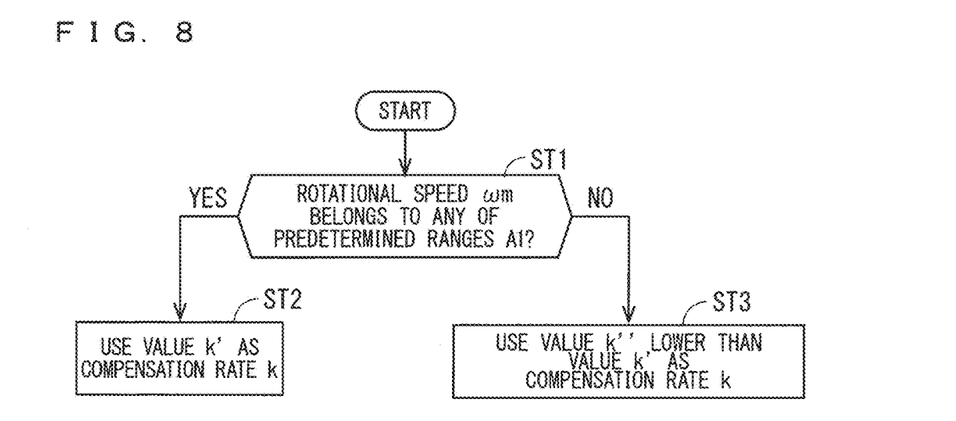
FIG. 8 is a flowchart showing an example of operation of a compensation rate setting unit.

FIG. 8 is a flowchart showing an example of operation of the compensation rate setting unit 12. In step ST1, the compensation rate setting unit 12 determines whether the rotational speed ωm belongs to any of the predetermined ranges A1. The predetermined ranges A1 are stored in the storage, for example, and the compensation rate setting unit 12 reads them, and determines whether the rotational speed ωm belongs to any of the predetermined ranges A1. This determination can be made on the basis of comparison between the end points defining the predetermined ranges A1 and the rotational speed ωm. The comparison can be made, for example, using a comparator.

When determining that the rotational speed ωm belongs to any of the predetermined ranges A1, the compensation rate setting unit 12 uses a value k' as the compensation rate k in step ST2. When determining that the rotational speed ωm belongs to none of the predetermined ranges A1, that is, determining that the rotational speed ωm belongs to any of the predetermined ranges A2, the compensation rate setting unit 12 uses a value k" as the compensation rate k in step ST3. The value k" is lower than the value k'.

The power control unit 11 generates control signals for the power buffer circuit 4 and the inverter 5 on the basis of the compensation rate k, and outputs them to the power buffer circuit 4 and the inverter 5. Specifically, control signals SSc, SSL, SSup, SSvp, SSwp, SSun, SSvn, and SSwn are generated and output to the switches Sc and SL and the switching elements Sup, Svp, Swp, Sun, Svn, and Swn. Not only the compensation rate k but also various parameters (e.g., the peak values Vm and Im, the power supply angular speed co, and a d-axis current id and a q-axis current iq) and various command values (e.g., a rotational speed command value ωm*) required for control are input into the power control unit 11, and the above-mentioned control signals are generated on the basis of them. Any of the techniques described in Japanese Patent Application Laid-Open No. 2015-084637, Japanese Patent Application Laid-Open No. 2015-065731 and Japanese Patent Application Laid-Open No. 2015-076921 can be used as a method of generating the control signals, for example.

As described above, in the present embodiment, a high compensation rate k is used when the rotational speed ωm belongs to any of the predetermined ranges A1 to reduce the peak of the sound level, while a low compensation rate k is used when the rotational speed ωm belongs to any of the predetermined ranges A2 to drive the motor 6 with high efficiency.

<Compensation Rate Kin Each of Plurality of Predetermined Ranges A1>

As illustrated in FIG. 6, the amplitude of the buffer power Pbuf increases with increasing rotational speed ωm. This is because of the following reason. First, as shown in the equation (2), the amplitude of the buffer power Pbuf increases when the peak value Im increases. As the rotational speed ωm increases, the amplitude of the AC currents iu, iv, and iw flowing to the motor 6 increases, and, as a result, the peak value Im of the input current Iin increases. The amplitude of the buffer power Pbuf thus increases with increasing rotational speed ωm.

As described above, the loss caused in the power buffer circuit 4 increases with increasing amplitude of the buffer power Pbuf. Thus, if the compensation rate k is constant, efficiency is reduced as the rotational speed ωm increases.

The increase in amplitude of the buffer power Pbuf with increasing rotational speed ωm may thus be suppressed by using a lower compensation rate k as the rotational speed ωm increases. For example, by setting the compensation rate k with respect to the rotational speed ωm so that the compensation rate k is inversely proportional to the peak value Im, the buffer power Pbuf can be maintained constant regardless of the rotational speed torn.

Figure 9:
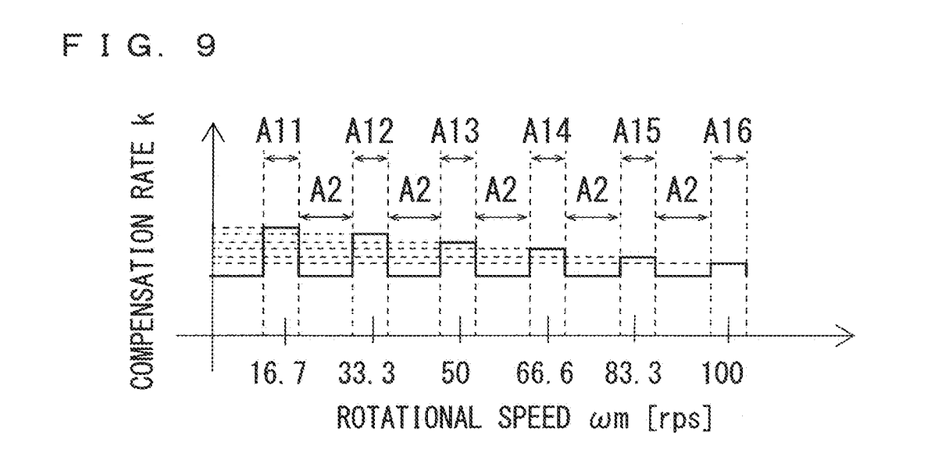
FIG. 9 is a diagram schematically showing an example of the compensation rate.

Note that, in the present embodiment, the compensation rate k is set to be higher in the predetermined ranges A1 than in the predetermined ranges A2 as described above. That is to say, the increase in amplitude of the buffer power Pbuf becomes conspicuous in the predetermined ranges A1. The compensation rate setting unit 12 may thus set the compensation rate k so that the compensation rate k in any of the plurality of predetermined ranges A1 in which the rotational speed is high is lower than the compensation rate k in any of the plurality of predetermined ranges A1 in which the rotational speed is low. FIG. 9 schematically shows another example of the relationship between the compensation rate k and the rotational speed ωm. In the example of FIG. 9, predetermined ranges A11 to A16 are shown as the plurality of predetermined ranges A1 to distinguish the plurality of predetermined ranges A1 from one another. The predetermined ranges A11 to A16 are each located on a higher side as a number of a reference sign increases. That is to say, the predetermined range A16 is located on the highest side, and the predetermined range A11 is located on the lowest side.

In the example of FIG. 9, the compensation rate k in the predetermined ranges A11 to A16 is set to be lower in a predetermined range in which the rotational speed is higher. That is to say, the compensation rate k is set to be lower in the predetermined range A16 than in the predetermined range A15, and is set to be lower in the predetermined range A15 than in the predetermined range A14. The same applies to the other predetermined ranges.

This can reduce the increase in amplitude of the buffer power Pbuf even when the rotational speed ωm increases. Reduction in efficiency with increasing rotational speed ωm can thus be suppressed.

Since the buffer power Pbuf provided and received by the power buffer circuit 4 can be reduced, power capacity of the power buffer circuit 4 can be reduced. This leads to reduction in cost and size of the power buffer circuit 4.

Figure 10A:
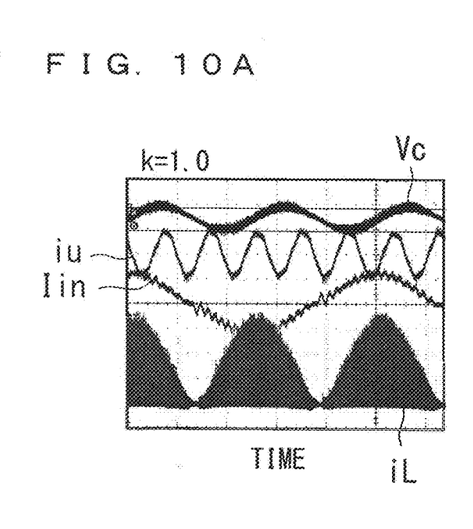
FIGS. 10A to 10C are diagrams illustrating an input current into a converter, a voltage across a capacitor of a boost circuit, an AC current output from an inverter, and a current flowing through a reactor of the boost circuit.
Figure 10B:
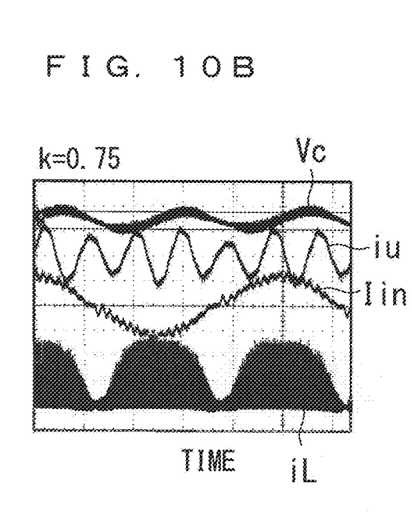
Figure 10C:
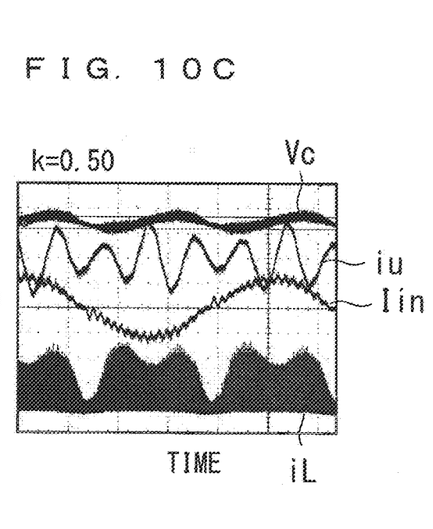
Figure 11:
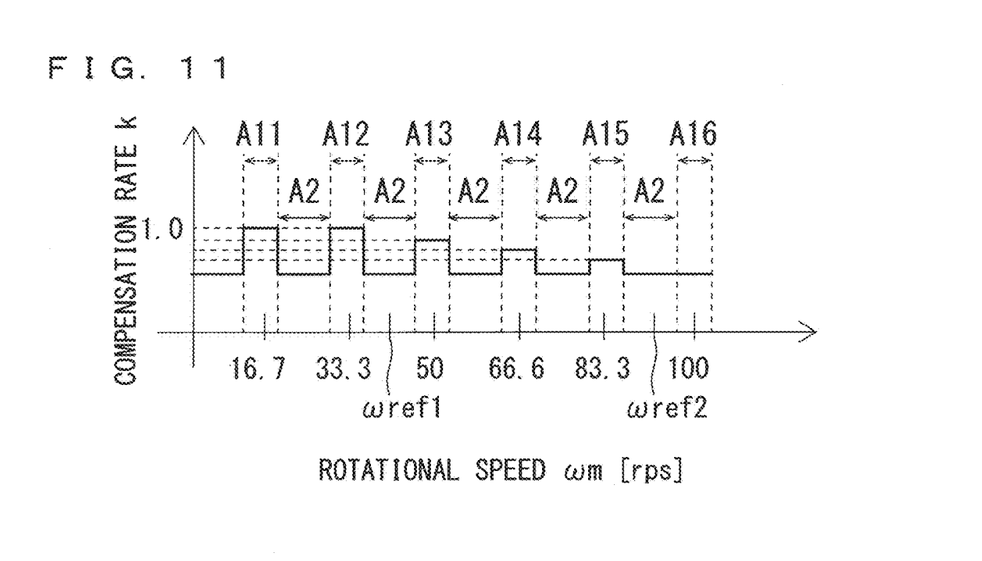
FIG. 11 is a diagram schematically showing an example of the compensation rate.

The reduction in cost and size of the power buffer circuit 4 will be described using a current flowing to the power buffer circuit 4. When the buffer power Pbuf is reduced, a current flowing through the power buffer circuit 4 is reduced. FIGS. 10A to 10C schematically show examples of various parameters. In the example of FIG. 11, a current iL flowing through the reactor L4 is shown as a typical current used to evaluate the current flowing through the power buffer circuit 4. In FIG. 11, in addition to the current iL, the voltage Vc, the AC current iu, and the input current Iin are shown for reference. FIGS. 10A, 10B, and 10C show the above-mentioned parameters when the compensation rate k is 1.0, when the compensation rate k is 0.75, respectively, and when the compensation rate k is 0.5. The graphs of FIGS. 10A to 10C are the same in rotational speed ωm of the motor 6.

As shown in FIGS. 10A to 10C, the current iL decreases with decreasing compensation rate k. Thus, the reactor L4 having small current capacity can be used. For example, the reactor L4 having a small wire diameter can be used. This contributes to reduction in cost and size of the reactor L4.

<Low Frequency Side>

As illustrated in FIG. 6, the amplitude of the buffer power Pbuf is small when the rotational speed ωm is low. Thus, when the rotational speed ωm is low, the buffer power Pbuf is less likely to exceed the power capacity of the power buffer circuit 4 even if the high compensation rate k is used. Thus, as shown in FIG. 11, when the rotational speed ωm is lower than a threshold ωref1, a high value, for example, a maximum value 1.0 may be used as the compensation rate k in predetermined ranges A1 (A11 and A12).

This can minimize the peak of the sound level of the noise when the rotational speed ωm of the motor 6 is low. In a case where the compressor to be driven by the motor 6 is mounted on the air conditioner, for example, a drive frequency (corresponding to the rotational speed ωm of the motor 6) of the compressor is often low when an indoor temperature is close to a target temperature. Thus, the sound level when the indoor temperature is close to the target temperature can be minimized by using the high compensation rate k when the rotational speed ωm is low. The indoor temperature and the target temperature usually diverge from each other in an early stage of an operation time period, and the rotational speed ωm of the motor 6 increases at the time. On the other hand, in most of the operation time period, the indoor temperature is close to the target temperature, and the rotational speed ωm is low. This becomes conspicuous especially in a case where the air conditioner is in continuous operation for a long time period. When the rotational speed ωm is low for a long time period as described above, the sound level can be minimized in most of the operation time period. That is to say, control in this manner is especially suitable for the air conditioner, in which the drive frequency is low for a long time period.

<High Frequency Side>

The cost and size of the power buffer circuit 4 are required to be increased as described above to raise the power capacity of the power buffer circuit 4. However, such an increase is undesirable. In a case where reduction in power capacity of the power buffer circuit 4 is given priority, the compensation rate k may be set in the following manner. That is to say, when the rotational speed ωm is higher than a predetermined threshold ωref2 (>ωref1), the compensation rate k in a predetermined range A1 (A16) may be set in a method other than the above-mentioned setting method as shown in FIG. 11. In other words, the above-mentioned setting method may be used only when the rotational speed ωm is lower than the threshold ωref2.

For example, when the rotational speed ωm is higher than the threshold ωref2, the compensation rate k in the predetermined range A1 may be set to be equal to the compensation rate k in the predetermined ranges A2. This can further reduce the buffer power Pbuf when the rotational speed ωm is higher than the threshold ωref2. Thus, a smaller value can be used as the power capacity of the power buffer circuit 4.

In a case where the compressor to be driven by the motor 6 is mounted on the air conditioner, a time period in which the rotational speed ωm is high is short as described above. Thus, in a case where the compressor is mounted on the air conditioner, reduction in power capacity of the power buffer circuit 4 is sometimes given priority over reduction in noise when the rotational speed ωm is high. The control is suitable in such a case.

In a case where the noise when the rotational speed ωm is higher than the threshold ωref2 becomes a problem, the noise may be reduced using another technique. Alternatively, when the rotational speed ωm is higher than the threshold ωref2, any value in the predetermined ranges A1 may be prohibited as the rotational speed command value ωm*. For example, when determining that the rotational speed command value ωm* belongs to any of the predetermined ranges A1, the power control unit 11 changes the rotational speed command value ωm* to a value that belongs to the predetermined ranges A2. It is desirable that the value after the change be close to the value before the change. This case reduce a time period in which the noise is created with the rotational speed ωm not taking the value in the predetermined ranges A1 for a long time period.

<Example of Method of Generating Control Signals>

An example of a method of generating the control signals will be described below for reference. The method of generating the control signals described in Japanese Patent Application Laid-Open No. 2015-084637 will be described herein.

The buffer power Pbuf is expressed by a difference (Pc−PL) between power PL input from the DC link into the power buffer circuit 4 and power Pc output from the power buffer circuit 4 to the DC link. The capacitor C4 is charged by the boost circuit 4a when the power PL is input from the DC link into the power buffer circuit 4, and thus the power PL is hereinafter also referred to as charge power PL. On the other hand, the capacitor C4 discharges as the switch Sc is conducting when the power Pc is output from the power buffer circuit 4 to the DC link, and thus the power Pc is hereinafter also referred to as discharge power Pc.

As examples of the above-mentioned charge power PL and discharge power Pc, they are determined by the following equations (4) and (5):

$$PL = k1 \cdot Vm \cdot Im \cdot \sin^2(\omega t) \tag{4}$$

$$Pc = k1 \cdot Vm \cdot Im \cdot \cos^2(\omega t) \tag{5}$$
$$= k1 \cdot Vm \cdot Im \cdot \cos(2\omega t) + PL$$

Herein, k1 is one half of the compensation rate k. The charge power PL is power that is (k1) times the input power Pin as shown in the equation (4), and the discharge power Pc is power that is obtained by adding the charge power PL to power that is (−2·k1) times an AC component of the input power Pin as shown in the equation (5).

It is obvious, from the equations (4) and (5) and an equation Pbuf=Pc·PL, that the equation (2) is satisfied.

In contrast to Japanese Patent Application Laid-Open No. 2015-065731 and Japanese Patent Application Laid-Open No. 2015-076921 in which the charge power PL and the discharge power Pc as described above are provided and received between the power buffer circuit 4 and the DC link in exclusive time periods (e.g., the first time period T1 and the second time period T2 in FIGS. 2A and 2B) in a power supply phase, the exclusive time periods in the power supply phase are herein not set.

However, discharge is dominant over charge in the first time period (hereinafter, also referred to as a "discharge dominant time period") T1 in which an inequation Pc>PL (i.e., Pbuf>0) holds, and charge is dominant over discharge in the second time period (hereinafter, also referred to as a "charge dominant time period") T2 in which an inequation Pc<PL (i.e., Pbuf<0) holds. As understood from the equations (4) and (5), the second time period T2 in which an inequation $(n+1/4)\pi \leq \omega t \leq (n+3/4)\pi$ holds is the charge dominant time period, and the first time period T1 in which an inequation $(n+3/4)\pi \leq \omega t \leq (n+5/4)\pi$ holds is the discharge dominant time period (n is an integer: the same applies to the following).

An art for setting a current irec1 flowing from the converter 3 to the inverter 5 of a current irec output from the converter 3 dependently of the value k1 (=one half of the compensation rate k) will be described next.

The rectified voltage Vrec shown in an equation (6) is applied to an output of the converter 3.

$$Vrec=|Vin|=Vm \cdot |\sin(\omega t)| \tag{6}$$

Power Prec directly heading from the converter 3 to the inverter 5 is obtained by subtracting the charge power PL from the input power Pin. That is to say, an equation Prec=Pin−PL holds, and thus the following equation (7) holds.

$$Prec=(1-k1) \cdot Vm \cdot Im \cdot \sin^2(\omega t)=|Vin| \cdot irec1 \tag{7}$$

The current irec1 is thus expressed by the following equation (8):

$$irec1=(1-k1) \cdot Im \cdot |\sin(\omega t)| \tag{8}$$

The equation (1) is based on the assumption that the input current Iin is expressed by Im·sin(ωt), that is, the input current Iin has a sinusoidal waveform, and thus the current iL satisfies an equation (9) shown below. This is because, as can be seen from FIG. 1, the current irec output from the converter 3 is equal to the sum (irec1+iL) of the current irec1 directly flowing from the converter 3 to the inverter 5 and the current iL, and the current irec is expressed by Im·|sin(ωt)|.

$$iL=k1 \cdot Im \cdot |\sin(\omega t)| \tag{9}$$

A peak value of the current iL is thus k1·Im. The peak value of the current iL thus decreases with decreasing value k1. The current iL is controlled on the basis of whether the switch SL is conducting or not. That is to say, the current iL can have a value shown in the equation (9) through appropriate control of the switch SL. The current iL in the equation (9) includes the value k1 (=one half of the compensation rate k), and thus a duty (also referred to as a boost duty) at which the switch SL is conducting is determined in accordance with the compensation rate k. Control of the switch SL for causing the current iL to have a value closer to a desired value is known as control of a boost chopper circuit, and thus detailed description thereof is omitted.

The discharge power Pc output from the power buffer circuit 4 is expressed by the product Vc·ic by introducing a discharge current ic flowing from the capacitor C4 to the inverter 5. The discharge current ic should satisfy the following equation (10) so that the discharge power Pc satisfies the equation (5).

$$ic = \frac{Pc}{Vc} = \frac{k1 \cdot Vm \cdot Im}{2Vc}(1+\cos(2\omega t)) \tag{10}$$

Figure 12:
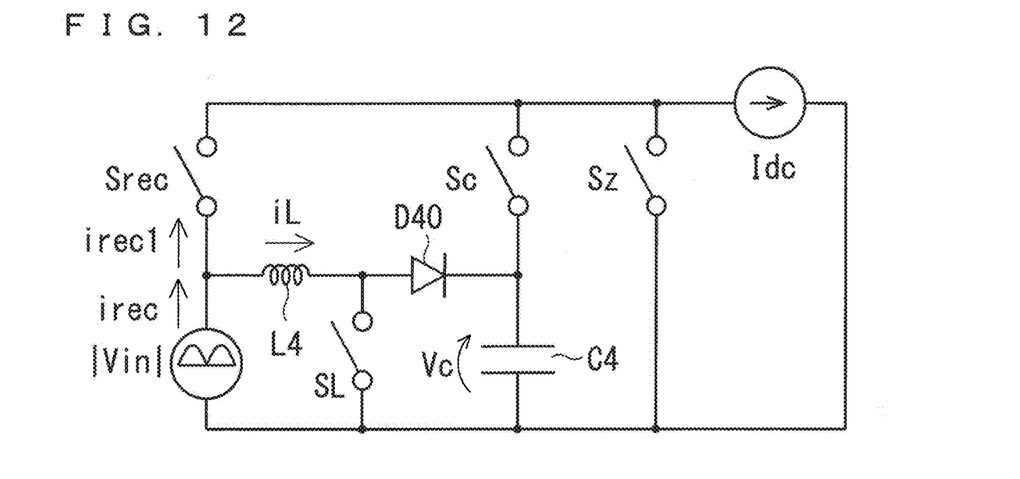
FIG. 12 is a diagram showing an example of an equivalent circuit.

FIG. 12 shows an equivalent circuit of the circuit shown in FIG. 1. The equivalent circuit is introduced, for example, in Japanese Patent Application Laid-Open No. 2015-084637. In the equivalent circuit, the current irec1 is equivalently expressed as a current irec1 passing through a switch Srec when the switch Srec is conducting. Similarly, the discharge current ic is equivalently expressed as a current ic passing through the switch Sc when the switch Sc is conducting. A current flowing to the motor 6 via the inverter 5 when the output terminals Pu, Pv, and Pw are connected in common to one of the DC power supply lines LH and LL in the inverter 5 is also equivalently expressed as a zero-phase current iz flowing through a switch Sz when the switch Sz is conducting. FIG. 12 shows the reactor L4, the diode D40, and the switch SL constituting the boost circuit 4a, and additionally shows the current iL flowing through the reactor L4.

In the equivalent circuit thus obtained, the following equation holds by introducing duties drec, dc, and dz at which the switches Srec, Sc, and Sz are respectively conducting and a DC current Idc input into the inverter 5.

$$\begin{pmatrix} irec \\ ic \\ iz \end{pmatrix} = \begin{pmatrix} drec & 1 \\ dc & 0 \\ dz & 0 \end{pmatrix} \cdot \begin{pmatrix} Idc \\ iL \end{pmatrix} \quad (11)$$

The currents irec1, ic, and iz are respectively obtained by multiplying the DC current Idc by the duties drec, dc, and dz, and thus are average values in switching periods of the respective switches Srec, Sc, and Sz.

The DC current Idc is the sum of the currents irec1, ic, and iz respectively passing through the switches Srec, Sc, and Sz, and thus an equation shown below holds. Note that inequations 0≤drec≤1, 0≤dc≤1, and 0≤dz≤1 hold.

$$drec+dc+dz=1 \quad (12)$$

The duties drec, dc, and dz can thus be seen as current distribution ratios of the DC current Idc to the currents irec1, ic, and iz. The duty drec is a duty at which a time period in which the converter 3 is connected to the DC link to allow a current to flow to the inverter 5 is set, and is thus hereinafter also referred to as a rectification duty drec. The duty dc is a duty at which the capacitor C4 discharges, and is thus hereinafter also referred to as a discharge duty dc. The duty dz is a duty at which the zero-phase current iz always flows in the inverter 5 regardless of a voltage output from the inverter 5, and is thus hereinafter also referred to as a zero duty dz.

The rectification duty drec and the discharge duty dc are respectively set by the following equations (13) and (14) from the equations (8), (10), and (11).

$$drec = (1-k1) \cdot \frac{Im}{Idc} \cdot |\sin(\omega t)| \quad (13)$$

$$dc = k1 \cdot \frac{Vm}{2Vc} \cdot \frac{Im}{Idc} \cdot (1+\cos(2\omega t)) \quad (14)$$

That is to say, the equations (8), (10), (13), and (14) are used upon request for the balance of power, and the equation (9) is used upon further request to make the input current Iin sinusoidal so that the equation (1) on which the abovementioned various equations are based is satisfied.

In a case where the converter 3 uses the diode bridge, the converter 3 cannot actively perform switching at the rectification duty drec shown by the equation (13). The current irec1 shown by the equation (8) can thus be obtained by the inverter 5 and the switch Sc performing switching respectively in accordance with the zero duty dz and the discharge duty dc determined by the equations (12), (13), and (14).

The inverter 5 cannot use the DC voltage in the DC link in a time period in which the zero-phase current iz flows. An imaginary DC voltage (hereinafter, referred to as an "imaginary DC voltage") Vdc of the DC voltage across the DC power supply lines LH and LL in a time period in which the inverter 5 can perform power conversion can thus be considered as follows:

$$Vdc=Vrec \cdot drec+Vc \cdot dc+0 \cdot dz \quad (15)$$

This can be understood as a voltage applied to the DC link as an average of a maximum value of a voltage that the inverter 5 can output in a period in which switching of the switches Sc and SL and the inverter 5 is controlled. In FIG. 12, the imaginary DC voltage Vdc is understood as a voltage generated across a current source Idc (through which the DC current Idc flows) representing the inverter 5 and the load thereon.

A ratio R (=Vdc/Vm) of the imaginary DC voltage Vdc to the peak value Vm is hereinafter referred to as a voltage utilization ratio. It can be understood from the equations (11), (12), and (14) that, by reducing the zero duty dz, a time period in which the zero-phase current flows through the inverter 5 can be reduced, and a time period in which the voltage applied to the DC link is used can thereby be increased. This leads an increase in voltage utilization ratio R.

Incidentally, the DC power Pdc input from the DC link into the inverter 5 is the product of the imaginary DC voltage Vdc and the DC current Idc. The inverter 5 obtains, from the DC link, the DC power Pdc (=Pin+Pc−PL) obtained by subtracting the charge power PL from the sum of the ripple power Pin and the discharge power Pc, and thus the following equation (16) holds.

$$Idc = \frac{Pin+Pc-PL}{Vdc} \quad (16)$$
$$= \frac{Vm \cdot Im}{2}(1-(1-2 \cdot k1)\cos(2\omega t)) \cdot \frac{1}{Vdc}$$

Note that neither the imaginary DC voltage Vdc nor the DC current Idc is limited in setting so far. That is to say, once the value k1 (=one half of the compensation rate k) is determined, the duties drec, dc, and dz can be set whatever the imaginary DC voltage Vdc and the DC current Idc are set as long as they satisfy the equation (16).

In Japanese Patent Application Laid-Open No. 2015-084637, the duties drec, dc, and dz are calculated by further adding conditions to maximize the voltage utilization ratio (=Vdc/Vm). For example, the duty dz is set to zero. This is because, as can be understood from the equations (12) and (15), the imaginary DC voltage Vdc is maximized when the zero duty dz is zero.

When the zero duty dz is zero, an equation (17) can be obtained from the equations (12), (15), and (14).

$$\frac{Im}{Idc}\left\{(1-k1) \cdot |\sin(\omega t)| + \frac{k1 \cdot Vm}{2Vc}(1+\cos(2\omega t))\right\} = 1 \quad (17)$$

The voltage Vc can herein be seen as being almost constant (for example, the voltage Vc varies by approximately 5%) despite charge and discharge in the power buffer circuit 4. The DC current Idc when the imaginary DC voltage Vdc is maximized is thus determined for each value k1 (=one half of the compensation rate k) from the equation (17). The duties drec, dc, and dz when the imaginary DC voltage Vdc is maximized are thereby determined for each value k1 from the equations (12), (13), and (14). The imaginary DC voltage Vdc at the time is determined by the equations (16) and (17).

The zero duty dz is a duty at which all the switching elements Sup, Svp, and Swp or all the switching elements Sun, Svn, and Swn are turned on in the inverter 5. The discharge duty dc is a duty at which the switch Sc is turned on, and a boost duty dL is a duty at which the switch SL is turned on. For example, the power control unit 11 generates the control signals for the inverter 5 and the power buffer circuit 4 on the basis of each of the duties dz, dc, and dL. For example, each control signal is generated on the basis of comparison between each duty and a carrier. The power control unit 11 outputs the generated control signals to the power buffer circuit 4 and the inverter 5 to appropriately control them to thereby bring the buffer power Pbuf closer to that in the equation (2).

In Japanese Patent Application Laid-Open No. 2015-084637, the control signals for the inverter 5 are generated as described below. First, a deviation of the rotational speed ωm from the rotational speed command value ωm* is calculated, and proportional integral control is performed on the deviation Δw. In parallel with this, the output power Pout is calculated on the basis of the AC currents iu, iv, and iw and the AC voltage (command value) of the motor 6, and a ripple component thereof is extracted. A deviation ΔP of the ripple component from a target ripple component (i.e., the second term of the rightmost side of the equation (3)) is calculated, and proportional integral control is performed on the deviation ΔP. Next, a result of the proportional integral control performed on the deviation Δω and a result of the proportional integral control performed on the deviation ΔP are added to generate a current command value. The current command value is a command value on the amplitude of the AC current flowing through the motor 6. The control signals for controlling the inverter 5 are generated on the basis of the current command value. Generation of the control signals based on the current command value is known, and thus detailed description thereof is omitted.

This enables correction of the rotational speed command value ω* to bring the output power Pout closer to that in the equation (3). This means that the inverter 5 is controlled at the above-mentioned duty dz through the control, for example.

Various embodiments described above can appropriately be modified and omitted unless any contradiction occurs. For example, the compensation rate k may be set on the basis of the rotational speed command value ωm* in place of the rotational speed ωm. For example, the compensation rate k when the rotational speed command value ωm* belongs to any of the predetermined ranges A1 may be set to be higher than the compensation rate k when the rotational speed command value ωm* belongs to any of the predetermined ranges A2.

While the power converter control device has been described in detail, the foregoing description is in all aspects illustrative, and does not limit the power converter control device. It is therefore understood that numerous modifications not having been described can be devised without departing from the scope of the power converter control device.

The invention claimed is:

1. A power converter control device for controlling a power buffer circuit and an inverter in a power converter including said power buffer circuit, a DC link, and said inverter, said DC link receiving ripple power having a first variation range as an input, providing and receiving buffer power to and from said power buffer circuit, and outputting DC power having a second variation range smaller than said first variation range, said inverter receiving said DC power as an input, and outputting AC power to a motor, said power converter control device comprising:
a power control unit that controls said power buffer circuit and said inverter on a basis of a compensation rate that sets said second variation range; and
a compensation rate setting unit that performs a setting in which said compensation rate when a rotational speed of said motor belongs to any of a plurality of first predetermined ranges is higher than said compensation rate when said rotational speed belongs to a second predetermined range other than said plurality of first predetermined ranges.

2. The power converter control device according to claim 1, wherein
said compensation rate setting unit sets said compensation rate in a first range of said plurality of first predetermined ranges lower than said compensation rate in a second range of said plurality of first predetermined ranges in which said rotational speed is lower than that in said first range.

3. The power converter control device according to claim 1, wherein
said compensation rate setting unit performs said setting only when said rotational speed belongs to any of said plurality of first predetermined ranges lower than a predetermined threshold.

4. The power converter control device according to claim 2, wherein
said compensation rate setting unit performs said setting only when said rotational speed belongs to any of said plurality of first predetermined ranges lower than a predetermined threshold.

5. The power converter control device according to claim 1, wherein
said compensation rate setting unit sets said compensation rate so that said second variation range becomes zero when said rotational speed belongs to any of said plurality of first predetermined ranges.

6. The power converter control device according to claim 2, wherein
said compensation rate setting unit sets said compensation rate so that said second variation range becomes zero when said rotational speed belongs to any of said plurality of first predetermined ranges.

7. The power converter control device according to claim 3, wherein
said compensation rate setting unit sets said compensation rate so that said second variation range becomes zero when said rotational speed belongs to any of said plurality of first predetermined ranges.

8. The power converter control device according to claim 4, wherein
said compensation rate setting unit sets said compensation rate so that said second variation range becomes zero when said rotational speed belongs to any of said plurality of first predetermined ranges.

* * * * *